United States Patent [19]

Simmons et al.

[11] Patent Number: 4,934,092
[45] Date of Patent: Jun. 19, 1990

[54] SPRING LOADED HOOK AND BAIT HOLDER

[76] Inventors: Billy R. Simmons, Rte. 1, Box 913A, Leeds; Frank Stanton, 413 Chickasaw, Trussville, both of Ala. 35173

[21] Appl. No.: 339,993

[22] Filed: Apr. 17, 1989

[51] Int. Cl.⁵ .............................................. A01K 83/06
[52] U.S. Cl. ........................................ 43/44.2; 43/36; 43/44.8; 43/44.6
[58] Field of Search ................ 43/36, 44.2, 44.6, 44.8

[56] References Cited

U.S. PATENT DOCUMENTS

| | | | |
|---|---|---|---|
| 650,277 | 5/1900 | Rossner | 43/36 |
| 2,554,735 | 5/1951 | Gibson | 43/36 |
| 2,644,264 | 7/1953 | Heki | 43/36 |
| 2,775,058 | 12/1956 | Roberts | 43/44.8 |
| 2,875,550 | 3/1959 | Pape | 43/44.2 |
| 3,400,483 | 9/1968 | Temple | 43/44.8 |
| 4,186,509 | 2/1980 | Maloney | 43/36 |

FOREIGN PATENT DOCUMENTS

| | | | |
|---|---|---|---|
| 490356 | 2/1953 | Canada | 43/44.8 |
| 802205 | 6/1936 | France | 43/44.6 |

*Primary Examiner*—Kurt Rowan
*Attorney, Agent, or Firm*—Jennings, Carter, Thompson & Veal

[57] ABSTRACT

A spring loaded bait holder includes two detachable J-shaped fish hooks clamped together by a biasing device. After attachment of the apparatus to a fishing line, a portion of bait may be inserted and retained between the hooks. The biasing device presses the hooks together and securely holds the bait in position during casting or extended immersion in water.

17 Claims, 2 Drawing Sheets

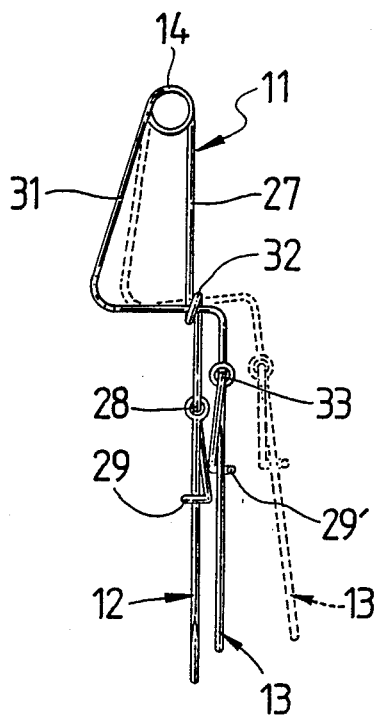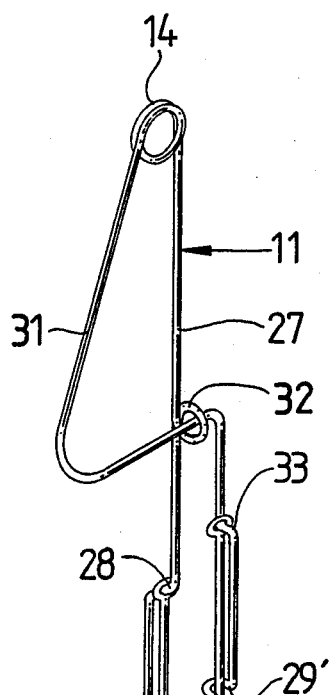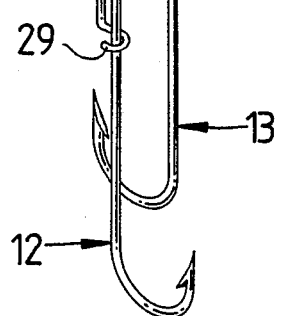
Fig. 7
Fig. 8
Fig. 6

SPRING LOADED HOOK AND BAIT HOLDER

FIELD OF THE INVENTION

This invention relates to the field of fishing tackle. More particularly, the present invention relates to the area of sport or commercial fishing where various forms of bait are utilized to entice fish into ingestion of a barbed hook. Even more particularly, this invention is a hook and bait retainer, utilizing spring-type tension to hold the fish bait firmly between two opposing hooks, thereby rendering traditional bait attachment practices unnecessary and obsolete.

BACKGROUND OF THE INVENTION

Fishing is an enjoyable and relaxing activity pursued by a large and diverse group of practitioners. The fishing tackle utilized by these sportsmen and sportswomen also varies considerably in appearance, cost and complexity. However, all fishing tackle retains a common feature, that is the venerable barbed hook, shaped generally like the letter "J". To attract a fish and entice the creature into swallowing the hook, bait is generally required. The bait must be attached to the hook in some manner to ensure that the material will remain in place until the fish are sufficiently aroused to strike. Traditionally, the barbed end of the hook is simply inserted into the bait material. The bait nestles into the arcuate portion of the fish hook and remains there until the hook is ingested by a fish.

The present hook baiting procedures place distinct and undesirable limits on the types of bait materials that are practicable for use. The physical composition of some types of otherwise excellent bait materials render them either impossible or impractical for use with the barbed hooks available in today's marketplace. For example, chunks of soft fish or animal flesh, intestinal parts, and chicken livers are excellent bait materials, particularly for scavengers such as catfish, however their viscous, easily decomposable nature makes hook mounting unpleasant and hook retention difficult. This is particularly true when casting the baited hooks out with rods and reels. The casting action frequently causes the bait to separate from the hook in flight before the line hits the water. Swift currents, long exposure to water, as in trot line or salt water applications, and light exploratory nibbles by inquisitive fish also cause these types of bait materials to separate prematurely from the hooks before the fish are sufficiently aroused to strike.

Some types of otherwise excellent and inexpensive bait materials cannot be used at all with conventional hooks. For example, nuggets of dry, grain-based dog food would merely crumble during any attempt to thread a conventional barbed hook through them. The new hook and bait holder eliminates this restriction on the materials usable as fish bait.

Many fishermen also simply dislike the bait mounting procedure. Many excellent bait materials have a slimy consistency and a strong odor, which makes handling unpleasant. The mere thought of contact with such malodorous matter deters many squeamish persons from participating in fishing altogether.

SUMMARY OF THE INVENTION

It is an object of the present invention to make the process of mounting biodegradable bait material on hooks an easier and more pleasant experience.

Yet another object of the present invention is to provide a method of firmly retaining viscous or fragile bait material on hooks under the following conditions: vigorous casting or swift currents; long exposure to water, such as trot lines and salt water trolling; or, exploratory nibbles by inquisitive fish before they become sufficiently aroused to strike.

Still another object of the present invention is to expand the list of usable bait materials to include potentially effective and inexpensive items such as nuggets of dry, grain-based dog food, for use as catfish bait, which were heretofore unusable due to crumbling when attempts were made to thread a barbed hook through them.

A further object of the invention is to provide two rather than one hook when using biodegradable materials, thereby increasing the odds in favor of the fisherman.

A further object of the invention is to provide a method for the fisherman to quickly and easily replace and interchange the hooks of his choice without removing the invention from the fishing line. This is an important feature, since hooks of different designs and sizes are frequently interchanged to catch various types of fish.

Another object of the invention is to benefit the economically depressed segments of our society who rely, to some extent, on the fish they catch to support their families and to put food on the table. Not only will this invention offer them opportunities to use new, more inexpensive bait materials, but it will greatly cut down on the amount of more expensive bait materials that would otherwise be required using conventional fishing methods.

Yet another object of the invention is to allow fishermen to wear gloves while fishing in cold weather and/or to prevent injury to their hands while taking the fish off the hooks. Since the use of this new device eliminates the need for bait to be manually loaded onto the hooks with the fisherman's fingers, gloves will become practicable for use while fishing.

To accomplish various of the above objectives, one embodiment of the instant invention provides mounting provisions for two barbed hooks, which may be quickly and easily attached or detached and replaced at the discretion of the fisherman. In a second embodiment the hooks are permanently attached and may not be removed or replaced. The two barbed hooks are normally installed with their straight elongated shanks parallel and adjacent and with their arcuate barbed portions oriented in opposition. The hooks are maintained in an adjacent parallel relationship by tension provided by a coiled spring, wire, or plastic clip. The apparatus may be easily squeezed open by the fisherman to load the bait, and then released much in the same manner as a clothespin. While in the released position, without bait being loaded, the two barbed hooks abut. When bait is to be loaded into the device, the fisherman squeezes the device to an open position, then positions the two barbed hooks over the bait and releases the tension. The bait then becomes securely held by the clamping action of the device, and the hooks then become partially camouflaged by being pressed against and partially embedded in the mass of the bait. This new device virtually eliminates the necessity for the fisherman to manually load bait onto the hooks with his or her fingers.

BRIEF DESCRIPTION OF THE DRAWINGS

Apparatus embodying features of my invention are depicted in the accompanying drawings which form a portion of this disclosure and wherein:

FIG. 6 is a perspective view of a second embodiment of my invention;

FIG. 7 is a side elevational view of the embodiment shown in FIG. 6; and

FIG. 8 is a side elevational view taken from the left of FIG. 7 showing my invention in operation.

DESCRIPTION OF A PREFERRED EMBODIMENT

Figure 1:
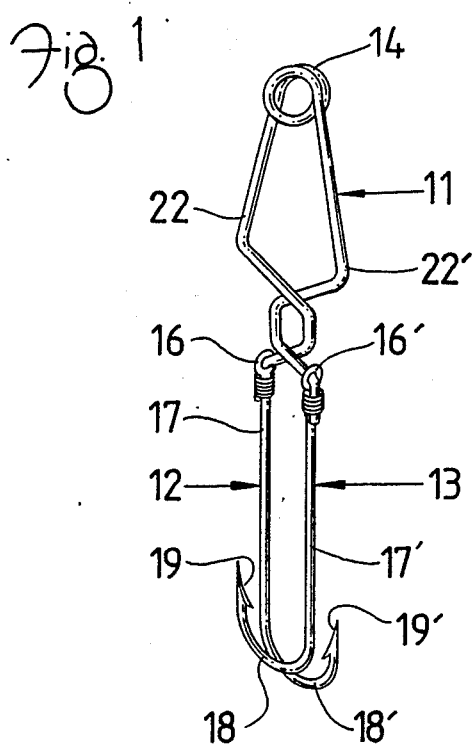
FIG. 1 is a perspective view of one embodiment of my invention.

Referring to the drawings for a better understanding of the invention, it may be seen in FIG. 1 that my spring-loaded bait holder is comprised of three major components: a resilient spring member 11 and two fish hooks 12 and 13, an arcuate region wire coil 14 in the resilient spring member 11 serves as an attachment point for a monofilament line or similar fishing line. Referring to FIGS. 1-5, a first embodiment of my invention is shown wherein a first fish hook 12 includes an attachment eyelet 16, an elongated portion 17, an arcuate portion 18 and an upturned barbed region 19. A second fish hook 13 includes a similar eyelet 16'. An elongate portion 17' lies adjacent the elongated portion 17 of the first fish hook 11, an arcuate region 18'abuts the first hook's arcuate region 18 at a single point. An upturned barbed region 19' is oriented in opposition to the barbed region 19 of the first fish hook 12. The spring member 11 maintains a tight abutting relationship between the hooks 12 and 13.

Figure 2:
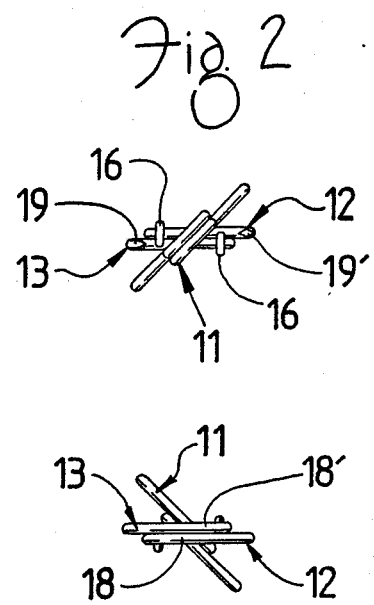
FIG. 2 is a top plan view thereof.

The top plan view of FIG. 2 shows the coplanar relationship of the hooks 12 and 13. The opposed barb ends 19 and 19' ensure that the apparatus will efficiently catch and hold the fish.

Figure 3:
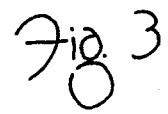
FIG. 3 is a bottom view thereof.

The bottom view shown in FIG. 3 depicts the close abutting relationship of the arcuate regions 18 and 18' of the hooks 12 and 13 when no bait is inserted therebetween.

Figure 4:
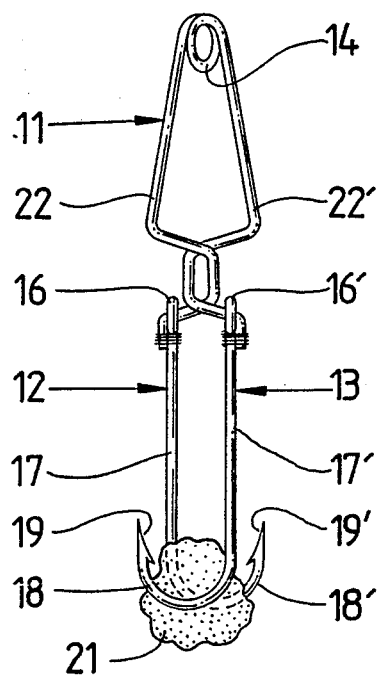
FIG. 4 is a side elevational view of the embodiment shown in FIG. 1 with a portion of bait in place.

FIG. 4 depicts the hooks with a portion of bait 21 retained therebetween. The clamping action provided by the spring member 11 holds the bait 21 firmly in position. The barbed regions 18 and 18' remain exposed to enable the fish to be hooked once he has taken the bait into his mouth.

Figure 5:
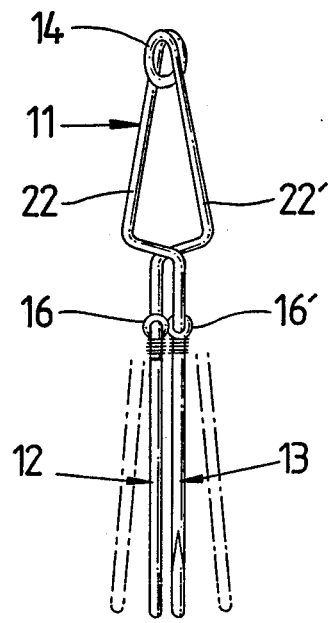
FIG. 5 is a side elevational view taken from the left of FIG. 4.

FIG. 5 details operation of the apparatus. The arcuate section 14 of the spring 11 serves as an attachment point to the fishing line, as previously mentioned. As may be seen, the arcuate portion is extended into a pair of arm members 22 and 22' which are bent and crossed to provide attachment points for the hooks 12 and 13, and actually serve to retain the hooks in their normal positions. In this embodiment the eyelets of the hooks 12 and 13 are placed on the crossed portion of the arm members 22 and 22' and then bound thereto in a manner similar to the manner in which lures are tied. The binding material is shown at 23. It should also be understood that the hooks may be directly formed on the ends of the arms members or may be bonded thereto by any suitable means such as welding, soldering, tacking, etc. A fisherman utilizing the present invention would exert pressure on the spring arms 22 and 22' to spread the hooks 12 and 13 to an open position. Thereafter a portion of the bait, regardless of what it is, may be captured between the hooks or the arms, by release of pressure on the spring arms such that the hooks engage the bait on either side. The bait is thus secured firmly between the hooks and the apparatus including the lure. The bait may then be cast or suspended from a fishing line in the traditional manner.

A second embodiment of my invention is shown in FIGS. 6-8 wherein the arcuate portion 14 is retained along with the hooks 12 and 13. However, the spring arms have been greatly modified. One of the arm members designated 27 is essentially linear, extending from the arcuate region 14 downward to a shoulder 28 and therebelow in a second linear region to a laterally opening terminus 29. The other arm designated 31 is curved extending downwardly from the arcuate portion 14 and then transversely to the linear portion 27 through an eye 32 formed on the linear arm 27 then turning downward again and forming a shoulder 33 which again is connected with a lower linear portion and an outwardly opening terminus 29'. Note that the arm members 27 and 31 have somewhat of the appearance of a FIG. 4 and that the lower terminus 29 and 29' and lower shoulders 28 and 33 on each of the arms extend in opposite directions. Note that the arm portion 31 is curved such that it cannot be retained inadvertently by the loop 32 when the arms are pressed together to load a portion of bait therebetween.

Note that the hooks 12 and 13 are placed on the lower portions of the arms 27 and 31 by passing the terminal end of each arm through the eyelet of the hook and then sliding the eyelet of the hook up the arm until it rests on the shoulder portion 28 or 33 then placing the shank of the hook within the outwardly opening terminus 29 or 29'. It will be appreciated that this places both the hook and lower portion of the arm member in a state of substantial tension such that the hooks cannot be accidentally dislodged. The hooks are securely tensioned by this placement procedure such that loads exerted on the hooks by fish only wedge the hook eyelet more tightly into the shoulder 28 or 33, thus the hook remains firmly in position until its shank is moved out of its resting place in the laterally opening terminus 29. When it is desirable to remove the hooks, the resulting release of tension occurring when the shank is forced from the terminus permits removal of the hooks. The hooks may be mounted in a variety of configurations orientating their respective barbed tips unidirectionally or in opposition. Hooks of a variety of shapes and sizes may also be used.

FIG. 7 shows the apparatus with a portion of bait in place. The bait may be positioned between the hooks 12 and 13 or between the lowermost portion of the arms 27 and 31. Note also that loads exerted on the hooks 12 and 13 by the fish are transferred to the attached line directly up the shaft of arm 27. Loads on the hook 29' are also transferred to the linear arm 27 through the eyelet 32. The above described arrangement assures that the apparatus will not deform under extreme pressure exerted by the fish and fisherman. FIG. 8 details the operation of my apparatus. As may be seen, pressure exerted on the arm 31 by a fisherman spreads the hooks 12 and 13 to an open position whereupon the appropriately sized portion of bait may be placed therebetween and the pressure released. Of course, release of the pressure allows the arms or hooks to return to a closed position about the bait and the bait is thus securely held between either the hooks or the lowermost portion of the arms 27 and 31. As noted hereinabove, the entire apparatus may be then cast or suspended in the traditional manner.

While I have shown my invention in two forms, it will be obvious to those skilled in the art that is not so limited but is susceptible to various changes and modifications without departing from the spirit thereof.

What I claim is:

1. A bait holder comprising a resilient spring member having a first and second end, said first and second ends each being adapted to engage and retain a barbed fishing hook, with said spring member urging said first and second ends into lateral biased opposition whereby a portion of bait may be retained therebetween and wherein said barbed fishing hooks comprise an attachment eyelet, an elongated stem, an arcuate portion and an upturned barbed tip; the elongated stem of said fishing hook engaged by said first end being adjacent to the elongated stem of said fishing hook engaged by said second end; said first and second ends each terminating in a laterally extending terminus open at one end, and having a lateral shoulder spaced above said terminus, said terminus and said shoulder extending in opposite directions, said terminus being adapted to engage and tension the elongated stems of said barbed fishing hooks to urge said attachment eyelets thereon into engagement with said shoulders, wherein said hooks are detachable from said terminus.

2. A bait holder as defined in claim 1 wherein the upturned barbed tip of said first hook is oriented in opposition to the upturned barbed tip of said second hook.

3. A bait holder as defined in claim 1 wherein the upturned barbed tips of said first and second hooks are oriented unidirectionally.

4. A bait holder as defined in claim 1 wherein the longitudinal axes of said first and second hooks are generally aligned with the longitudinal axis of said first arm.

5. A bait holder as defined in claim 1 wherein said first and second hooks are located in parallel planes.

6. A bait retaining angling device comprising:
(a) a biasing spring having a linear arm and an arcuate arm;
(b) a first fish hook detachably mounted on said linear arm;
(c) a second fish hook detachably mounted on said arcuate arm, said biasing spring clamping said arcuate arm into abutment with said linear arm whereby a portion of bait may be retained therebetween; wherein said arcuate arm is stabilized by and is displacable within a guide loop in said linear arm, said arcuate arm being curved to prevent accidental locking in said loop.

7. A bait retaining device as defined in claim 6 wherein said linear arm and said arcuate arm have a shoulder region adapted to accept the attachment eyelets of said first and second hooks and a terminus adapted for engagement with the elongated regions thereof.

8. A bait retaining device as defined in claim 6 wherein said first and second hooks are co-planar.

9. A bait retaining device as defined in claim 6 wherein the upturned barbed region of said first hook is oriented in opposition to the upturned barbed region of said second hook.

10. A bait retaining device as defined in claim 6 wherein the upturned barbed regions of said first and second hooks are unidirectional.

11. A bait retaining device as defined in claim 6 wherein the longitudinal axis of said linear arm, said first hook and said second hook are generally aligned.

12. A bait retaining device as defined in claim 6 wherein said first and second hooks are coplanar.

13. A bait retaining angling device comprising:
(a) a biasing spring having a linear arm and an arcuate arm;
(b) a first fish hook detachably mounted on said linear arm;
(c) a second fish hook detachably mounted on said arcuate arm, said biasing spring clamping said arcuate arm into abutment with said linear arm whereby a portion of bait may be retained therebetween; wherein said first and second hooks each comprise an attachment eyelet, an elongated region and an upturned barbed region, said elongated region of said first hook being contiguous to the elongated region of said second hook.

14. A bait retaining device as defined in claim 13 wherein said linear arm and said arcuate arm have a shoulder region adapted to accept the attachment eyelets of said first and second hooks and a terminus adapted for engagement with the elongated regions thereof.

15. A bait holder comprising a resilient spring member having a first and second end, said first and second ends each being adapted to engage and retain a barbed fishing hook, said fishing hooks being readily disengageable and reengageable to said first and second ends, with said spring member urging said first and second ends into lateral biased opposition whereby a portion of bait may be retained therebetween.

16. A bait holder as defined in claim 15 wherein a first barbed hook retained by said first end and a second barbed hook retained by said second end each comprise an attachment eyelet, an elongated stem, an arcuate portion and an upturned barbed tip; the elongated stem of said first hook being adjacent to the elongated stem of said second hook.

17. A bait retaining angling device comprising:
(a) biasing spring having a linear arm and an arcuate arm;
(b) a first fish hook mounted on said linear arm, being readily disengageable and reengageable thereon;
(c) a second fish hook mounted on said arcuate arm, being readily disengageable and reengable thereon, said biasing spring clamping said arcuate arm into abutment with said linear arm whereby a portion of bait may be retained therebetween.

* * * * *